US011177049B2

(12) United States Patent
Rhodes et al.

(10) Patent No.: US 11,177,049 B2
(45) Date of Patent: Nov. 16, 2021

(54) SELF-HEALING INSULATION FLUID FOR REPAIRING DAMAGED FLUID FILLED CABLES

(71) Applicant: Kinectrics UK Limited, Guildford (GB)

(72) Inventors: Rhys Rhodes, Guildford (GB); Gary Stevens, Guildford (GB); Ian German, Guildford (GB); Susmit Basu, Guildford (GB)

(73) Assignee: Kinectrics UK Limited, Guildford (GB)

( * ) Notice: Subject to any disclaimer, the term of this patent is extended or adjusted under 35 U.S.C. 154(b) by 0 days.

(21) Appl. No.: 16/630,386

(22) PCT Filed: Jul. 12, 2018

(86) PCT No.: PCT/GB2018/051982
§ 371 (c)(1),
(2) Date: Jan. 10, 2020

(87) PCT Pub. No.: WO2019/012283
PCT Pub. Date: Jan. 17, 2019

(65) Prior Publication Data
US 2020/0135359 A1   Apr. 30, 2020

(30) Foreign Application Priority Data
Jul. 12, 2017  (GB) ..................................... 1711185

(51) Int. Cl.
*H01B 3/20* (2006.01)
*B01D 15/08* (2006.01)
*B01D 61/14* (2006.01)

(52) U.S. Cl.
CPC .............. *H01B 3/20* (2013.01); *B01D 15/08* (2013.01); *B01D 61/14* (2013.01); *B01D 2311/25* (2013.01); *B01D 2311/2626* (2013.01)

(58) Field of Classification Search
CPC . H01B 3/20; H01B 3/22; B01D 15/08; B01D 61/14; B01D 2311/25; B01D 2311/2626; C10M 2207/2835; C10M 2207/401; C10M 177/00; C10M 105/38; C10N 2040/16
USPC .................................................. 252/579, 570
See application file for complete search history.

(56) References Cited

U.S. PATENT DOCUMENTS

| | | | | |
|---|---|---|---|---|
| 4,033,854 A | * | 7/1977 | Ohmori ..................... | H01B 3/22 208/14 |
| 2008/0177121 A1 | * | 7/2008 | Wu ........................ | C08F 110/14 585/530 |
| 2012/0103654 A1 | * | 5/2012 | Bertrand ................. | H02G 15/20 174/110 R |
| 2017/0088431 A1 | * | 3/2017 | Shahsavari ........... | E01C 11/005 |
| 2018/0180332 A1 | * | 6/2018 | Opalka ................ | C10M 105/38 |

OTHER PUBLICATIONS

Fuller's Earth, Wikipedia, 5 pages, Dec. 2, 2020. (Year: 2020).*
Thermoset Coatings, Encycloopedia of Materials: Science and Technology, pp. 1-7, 2001. (Year: 2001).*
Bhuyan et al., (2010) "Effects of Crosslinking on Tribological Behavior of Tung Oil-based Polymers", 43(4):831-837.
Database WPI Week 201737 Thomson Scientific, London, GB; AN 2017-17131A XP002785258, & CN 106635276 A Tongling Rike Electronic Co Ltd May 10, 2017 abstract.
Database WPI Week 201726 Thomson Scientific, London, GB; AN 2017-33571K XP002785257, & CN 106433904 A Tongling Rike Electronic Co Ltd Feb. 22, 2017 abstract.
Samadzadeh et al., (2011) "Tung Oil: An Autonomous Repairing Agent for Self-healing Epoxy Coatings", Progress in Organic Coatings 70(4):383-387.
Wikipedia entry for 'Iodine value' at https://en.wikipedia.org/wiki/Iodine_value [date accessed Apr. 12, 2018].

* cited by examiner

*Primary Examiner* — Douglas J McGinty
(74) *Attorney, Agent, or Firm* — Rudy J. Ng; Bozicevic, Field & Francis LLP

(57) ABSTRACT

The disclosure describes a method of purifying a self-healing fluid (SHF) comprising a drying oil and dielectric fluid. The method comprises (a) filtering the SHF through an absorbent material; and (b) subsequently filtering the SHF through a micropore filter system.

12 Claims, 13 Drawing Sheets

SELF-HEALING INSULATION FLUID FOR REPAIRING DAMAGED FLUID FILLED CABLES

The present invention relates to self-healing fluids, and particularly, although not exclusively, to a self-healing fluid (SHF) which may be used in a fluid filled cable (FFC). The invention extends to developing a dielectric SHF which is suitable for use in electrical assets, through the selection of components, their blending, purification, and electrical characterisation.

Across the developed world, underground circuits (UGCs) provide an important function within power distribution networks. Although they are significantly more expensive than a comparative overhead line (OHL) their resistance to extreme weather and reduced visual impact means that they can be deployed in locations where OHLs would be unsuitable.

Although the majority of UGCs are insulated with an extruded polymeric layer, there exists within most networks a number of cables insulated with a layer consisting of tightly lapped cellulosic paper impregnated with a low-viscosity insulating cable oil. Other cables feature ducts filled with insulating cable oils of varying viscosity, in many configurations, also containing a paper insulating layer. These fluid filled cables (FFCs) are often present as part of legacy systems, utilised before the effective purification of polymers allowed their use as an insulation system at higher voltages enabling extruded polymeric cables to be widely adopted. Although many FFCs were replaced during the 1980s, roughly 8,500 km remain within the UK power network, often in heavily urbanized regions where replacement is unfeasible or the costs are prohibitive. This is also the case in other parts of the world. As a result, almost all remaining FFCs are now operating substantially beyond their operational lifetimes, which has implications for the integrity of cables with a lead sheath. Over time, the sheath and lead plumbed joints will crystallize and become increasingly brittle to the point that comparatively minor mechanical stressors (including light impacts, vibration, or earth movement) will result in the formation of cracks. This type of damage can also occur within the plumb joint region, particularly in cables sheathed with corrugated aluminium.

When the sheath of an FFC cable is breached, the insulating cable oil will leak from the cable into the surrounding environment. The loss of oil is exacerbated by the fact that the cable is held under a positive pressure (3-8 bar), and the insulating cable oils have a low viscosity and a very low surface tension, allowing leaks to occur through micron-sized pinholes. Oil leaks have implications for both the cable itself and the surrounding environment; if the cable is allowed to leak unchecked, then the volume of oil within the insulation will fall to the point that voids will form, resulting in partial discharges and the rapid deterioration leading to the electrical failure of the cable insulation. Additionally, the leaked oil will pollute the surrounding environment, and is of particular concern if the leak is near potable water sources. Accordingly, cable operators are required to monitor leakage rates and report those above specific thresholds (typically 100 L/month, or 40 L/month in environmentally sensitive areas). Cable leaks must be located and resolved rapidly and even then the operators may face additional costs related to environmental remediation and loss of service.

It has been suggested that by adding a drying oil to a dielectric fluid, it can operate as an insulating cable oil and provide a self-healing fluid (SHF) which would be capable of repairing an FFC. This is problematic as the SHF must have similar physical properties to the original dielectric fluid as well as being able to reliably repair any damage to the FFC. US2012103654 describes the mode of action of a self-healing fluid comprising tung oil, a dielectric fluid, and a catalyst to deliver cable repair, but does not describe any methods required to produce an SHF with suitable electrical insulation oil properties.

The present invention arises from the inventors' work in attempting to solve the problems associated with the prior art.

In accordance with a first aspect of the invention, there is provided a method of purifying a self-healing fluid (SHF) comprising a drying oil and dielectric fluid, the method comprising:
a) filtering the SHF through an absorbent material; and
b) subsequently filtering the SHF through a micropore filter system.

Advantageously, the inventors have found that an SHF produced using the method of the first aspect has improved dielectric breakdown properties.

The method may comprise repeating steps (a) and (b) consecutively at least once. Preferably, the oil would be continuously recirculated through a purification system.

The dielectric fluid may be an insulating cable oil. Such oils can be based on linear alkylbenzenes (such as T3788) or alkylate/polybutene blends (such as the Soltex DF series). Historical oils have also included mineral oils or mineral oil/paraffin blends. The requirement is that the insulating oil and the drying oil be fully miscible.

The absorbent material may comprise an effective ion-exchange medium, for example Fuller's Earth, attapulgiate, bentonite or calcium montmorillonate. Preferably, the absorbent material comprises Fuller's Earth, and most preferably the absorbent material is a layer of Fuller's Earth. It may be appreciated that Fuller's Earth is a clay. Fuller's earth may be or comprise palygorskite or bentonite.

The method may comprise recovering the SHF from the absorbent material. Recovering the SHF from the absorbent material may be conducted subsequent to filtering the SHF through the absorbent material and prior to filtering the SHF through the micropore filter system. Recovering the SHF from the absorbent material may comprise filtering the system through a series of filter cloths, thereby removing absorbent material and recovering the SHF. Alternatively, recovering the SHF from the absorbent material may comprise centrifuging a mixture comprising the SHF and the absorbent material, and thereby recovering the SHF.

Preferably, the micropore filter system comprises a membrane filter, and more preferably a nitrocellulose membrane filter. Preferably, the micropore filter system has a pore size of less than 50 μm, more preferably less than 40 μm, less than 30 μm or less than 20 μm, even more preferably less than 15 μm, less than 12.5 μm or less than 10 μm, and most preferably less than 9 μm. Preferably, the micropore filter system has a pore size of between 0.5 μm and 50 μm, more preferably between 1 μm and 40 μm, between 2 μm and 30 μm or between 2.5 μm and 20 μm, even more preferably between 3 μm and 9 μm.

Preferably, the weight ratio of the drying oil to the dielectric fluid is between 5:95 and 35:65, more preferably between 10:90 and 30:70, and most preferably between 15:85 and 25:75.

The drying oil (e.g. linseed, wood, poppyseed, nut or sunflower oil) may comprise, to a large extent of linoleic and linolenic acids, and, to a lesser extent, oleic acid, due to the presence of predominantly unsaturated fatty acids with several double bonds (Rouette, Hans-Karl. (2001). Encyclopedia of Textile Finishing. Woodhead Publishing).

Hence, the drying oil may comprise one of a range of alkyd resins or unsaturated oils, such as linseed oil, walnut oil, or tung oil. Preferably, the drying oil is tung oil.

It will be appreciated that, for "Non-drying oils", the iodine values are below 100. Contact with oxygen does not cause any appreciable drying. For "Semi-drying oils", the iodine values range from 100-130. These oils dry within acceptable limits. For "Drying oils", the iodine values range from 130-190. They dry rapidly on contact with atmospheric oxygen.

Preferably, subsequent to purifying the SHF, the method comprises adding a catalyst to the purified SHF. The catalyst is preferably configured to increase the rate of a cross-linking reaction. The catalyst may comprise a mineral salt. Preferably, the catalyst comprises an iron or cobalt based catalyst. In one embodiment, the catalyst comprises cobalt naphthenate. The amount of the catalyst added to the purified SHF may be less than 10 wt %, preferably less than 5 wt %. The amount of the catalyst added to the purified SHF may be at least 0.01 wt %, preferably at least 0.1 wt %. The amount of the catalyst added to the purified SHF may be between 0.01 and 10 wt %, preferably between 0.1 and 5 wt %. These percentages are relative to the SHF composition as whole, rather than a proportion of the drying oil.

Subsequent to purifying the SHF, the method may also comprise adding a compatibiliser to the purified SHF, wherein the compatibiliser is configured to improve the miscibility of the catalyst. The compatibiliser may be added before, after or simultaneously to adding the catalyst. The compatibiliser may comprise a soap, preferably a zinc-based soap. The amount of the compatibiliser added to the purified SHF may be less than 10 wt %, preferably less than 5 wt %, and more preferably less than 3 wt %. The amount of the compatibiliser added to the purified SHF may be at least 0.01 wt %, preferably at least 0.1 wt %, and more preferably at least 0.5 wt %. In a preferred embodiment, the amount of the compatibiliser added to the purified SHF is between 1 and 2 wt %.

Preferably, after filtering the SHF through an absorbent material, and before filtering the SHF through a Millipore filtration system, the method comprises filtering the SHF through sand.

In accordance with a second aspect, there is provided a method of producing a purified SHF, the method comprising:
  contacting one or more drying oils and a dielectric fluid to produce a SHF; and
  purifying the SHF as defined by the first aspect.

Preferably, the or each drying oil and the dielectric fluid are as defined in the first aspect.

Preferably, the drying oil is selected by assessment of composition through spectroscopic analysis, with respect to the level of:
  average unsaturation per triglyceride unit; and
  mole fraction of residues containing doubly allylic $CH_2$ groups.

Preferably, a further drying oil or small molecule is added to the SHF formulation to increase the mole fraction of residues containing doubly allylic $CH_2$ groups.

The inventors believe that the SHF obtained using the methods of the first and second aspects is novel per se.

Accordingly, in a third aspect, there is provided a self-healing fluid (SHF) comprising a drying oil and a dielectric fluid with an electrical breakdown voltage of at least 30 kV.

The electrical breakdown voltage is the electrical breakdown voltage measured when tested using brass electrodes separated by a distance of 2.5 mm, according to IEC 60156 and conducted in the 'room temperature' range between 20-250° C.

Preferably, the drying oil is a tung oil.

Preferably, the electrical breakdown voltage is at least 35 kV, at least 40 kV or at least 45 kV, more preferably at least 50 kV, at least 60 kV or at least 70 kV, and most preferably at least 80 kV.

Preferably, the SHF has a dielectric dissipation factor (DDF) of less than 0.1, more preferably less than 0.08 or less than 0.06, and most preferably less than 0.04. Preferably, the DDF is determined using the method described in standard IEC60247 at temperatures of 25° C. or 90° C.

Preferably, the SHF has a water content of less than 100 ppm, more preferably less than 80 ppm or less than 60 ppm, and most preferably less than 50 ppm. Preferably, the water content is determined using the method described in standard IEC 814. Water content may be obtained via Karl Fisher titration, which is carried out under ambient conditions.

Preferably, the SHF has a viscosity of less than 15 mPas$^{-1}$ at 20° C., more preferably less than 12 mPas$^{-1}$ at 40° C., less than 11 mPas$^{-1}$ at 40° C., less than 9 mPas$^{-1}$ at 40° C. or less than 7 mPas$^{-1}$ at 40° C., and most preferably less than 6 mPas$^{-1}$ at 40° C. The viscosity may be measured using a cone and plate rheometer, where the cone and plate each have a diameter of 5 cm and the cone has a 1° angle, and the shear rate is 1000 s$^-$. The viscosity may be measured using the method described in ASTM D445.

In accordance with a fourth aspect, there is provided a fluid filled cable (FFC) comprising the self-healing fluid of the third aspect.

In accordance with an fifth aspect, there is provided a method of improving the ability of a fluid filled cable (FFC) comprising a self-healing fluid (SHF) to self-repair, the method comprising surrounding the FFC with a granular material.

Advantageously, if the cable becomes damaged then the SHF and the granular material form a plug, effectively repairing the cable.

In accordance with a sixth aspect, there is provided use of a granular material and a self-healing fluid (SHF) to repair a fluid filled cable (FFC).

Preferably, the FFC is the FFC of the fourth aspect. Preferably, the SHF is the SHF of the third aspect.

Preferably, the granular material comprises silica, and more preferably silicon dioxide ($SiO_2$). Most preferably, the granular material is sand. Preferably, the granular material comprises a plurality of grains with an average width between 0.001 mm and 10 mm, more preferably between 0.01 mm and 5 mm, and most preferably between 0.06 mm and 2 mm.

In a seventh aspect of the invention, there is provided a method of determining if a drying oil is suitable for use in a self-healing fluid (SHF) formulation, wherein the drying oil comprises a plurality of compounds of formula (I):

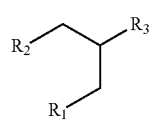

Formula (I)

wherein each $R_1$, $R_2$ and $R_3$ are independently an oxygen linked fatty acid; the method comprising:

determining the average number of proportion of the plurality of compounds of formula (I) which comprise a doubly allylic $CH_2$ group; and determining that the drying oil is suitable for use in a SHF if at least 5 mol % of the plurality of compounds of formula (I) comprise a doubly allylic $CH_2$ group.

Advantageously, the method allows a manufacturer to determine if the drying oil is suitable for use in a SHF.

Preferably, the method is a method of selecting an optimal drying oil for use in a self-healing fluid (SHF) formulation.

$R_1$, $R_2$ and $R_3$ may each be:

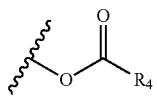

wherein each $R_4$ is independently a $C_1$ to $C_{40}$ alkyl, a $C_1$ to $C_{40}$ alkenyl or a $C_1$ to $C_{40}$ alkynyl. Preferably, each $R_4$ is independently is a $C_5$ to $C_{30}$ alkyl, a $C_5$ to $C_{30}$ alkenyl or a $C_5$ to $C_{30}$ alkynyl, more preferably a $C_{10}$ to $C_{25}$ alkyl, to $C_{10}$ to $C_{25}$ alkenyl or a $C_{10}$ to $C_{25}$ alkynyl, and most preferably a $C_{15}$ to $C_{20}$ alkyl, a $C_{15}$ to $C_{20}$ alkenyl or a $C_{15}$ to $C_{20}$ alkynyl. In a preferred embodiment, $R_4$ is an alkyl or alkenyl. $R_1$, $R_2$ and $R_3$ may each independently be selected from α-eleostearate; β-eleostearate; linoleate; a conjugated linoleate; linolenate; palmitate and oleate. It will be appreciated that each of these are oxygen linked fatty acids.

It may be appreciated that when $R_1$, $R_2$ and/or $R_3$ is α-eleostearate, it will have the following structure:

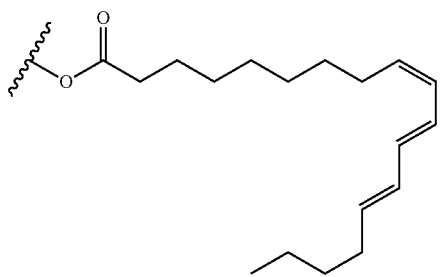 [SMILES: *OC(=O)CCCCCCC\C=C/C=C/C=C/CCCC]

Accordingly, the average number of double bonds in α-eleostearate is 3.

Similarly, the average number of double bonds in β-eleostearate and linolenate is 3, the average number of double bonds in linoleate is 1, the average number of double bonds in oleate is also 1, and the average number of double bonds in palmitate is 0.

Accordingly, the average number of double bonds in the compound of formula (I) may depend on the proportion of α-eleostearic acid; linoleic acid; palmitic acid and/or oleic acid components within the plurality of compounds of formula (I). For instance, if $R_1$, $R_2$ and $R_3$ are each α-eleostearic acid, the average number of double bonds in the compound of formula (I) would be 9.

Preferably, the method comprises determining that the drying oil is suitable/optimal for use in a SHF if the average number of double bonds in a molecule described by formula (I) is at least 6, more preferably at least 7 and most preferably at least 8.

In other embodiments, the average number of double bonds is at least 7.5, at least 7.75 or at least 8, more preferably at least 8.25 or at least 8.5, even more preferably at least 8.6, at least 8.7, at least 8.8 or at least 8.9, and most preferably at least 8.95.

Preferably, the method comprises determining that the drying oil is suitable/optimal for use in a SHF if at least 6 mol %, at least 7 mol %, at least 8 mol % or at least 10 mol % of the plurality of compounds of formula (I) comprise a doubly allylic $CH_2$ group.

If less than 5 mol % of the plurality of compounds of formula (I) comprise a doubly allylic $CH_2$ group then the oil may be unsuitable or not optimised for use in a self-healing fluid (SHF) formulation. The method may comprise contacting the drying oil with an additional component to thereby cause the drying oil to be suitable and/or optimised for use in a self-healing fluid (SHF) formulation.

The additional component may be a further drying oil comprising a plurality of compounds of formula (I), wherein more than 5 mol % of a plurality of compounds of formula (I) in the further drying oil comprise a doubly allylic $CH_2$ group, more preferably at least 6 mol %, at least 7 mol %, at least 8 mol % or at least 10 mol % of the plurality of compounds of formula (I) in the further drying oil comprise a doubly allylic $CH_2$ group. The drying oil and further drying oil may be contacted at a ratio sufficient to ensure that at least 5 mol % of the plurality of compounds of formula (I) in the resultant composition comprise a doubly allylic $CH_2$ group.

Alternatively, or additionally, the additional component may comprise a plurality of small molecules comprising a doubly allylic $CH_2$ group. The plurality of small molecules may comprise a monoester, an alkyd and/or an activating small molecule (or an alkyl). The resultant composition comprising the drying oil and the plurality of small molecules may comprise a plurality of molecules consisting of the plurality of molecules of formula (I) and the plurality of small molecules. The drying oil and the plurality of small molecules may be contacted at a ratio sufficient to ensure that at least 5 mol % of the plurality of molecules in the resultant composition comprise a doubly allylic $CH_2$ group.

Determining the average number of double bonds in the compound of formula (I) may comprise:

obtaining a $^1H$ NMR spectra for the drying oil; and determining a calibrated integration value for the number of hydrogen atoms which are directly bonded to an $sp^2$ hybridised carbon atom.

An $sp^2$ hybridised carbon atom may be understood to refer to a carbon atom which forms a double bond with a further atom.

It will be appreciated that the calibrated integration value for the number of hydrogen atoms which are directly bonded to an $sp^2$ hybridised carbon atom may be halved to give the average number of double bonds. Accordingly, the method may comprise determining that the drying oil is suitable for use in a SHF if the calibrated integration value is at least 14.5.

Accordingly, in an eighth aspect, there is provided a method of determining if a drying oil is suitable for use in a SHF formulation, the method comprising:

obtaining a $^1H$ NMR spectra for the drying oil;

determining a calibrated integration value for the number of hydrogen atoms which are directly bonded to an $sp^2$ hybridised carbon atom; and determining that the drying oil is suitable for use in a SHF if the calibrated integration value is at least 14.5.

Preferably, the method is a method of selecting an optimal drying oil for use in a self-healing fluid (SHF) formulation.

A suitable/optimal drying oil which is selected using the method of the seventh or eighth aspect may be the drying oil of the first, second or third aspect.

Preferably, the calibrated integration value is at least 15, at least 15.5 or at least 16, more preferably at least 16.5 or at least 17, even more preferably at least 17.2, at least 17.4, at least 17.6 or at least 17.8, and most preferably at least 17.9.

The calibrated integration value may be calculated for peaks found between 6.5 ppm and 5.3 ppm of the spectra.

The inventors believe that this use of NMR is novel and inventive per se.

Accordingly, in a ninth aspect, there is provided use of NMR spectroscopy to determine if a drying oil is suitable for use in a SHF formulation.

Preferably, the NMR spectroscopy is $^1$H NMR spectroscopy.

Preferably, the drying oil in the eighth aspect is a tung oil.

Alternatively, or additionally, determining the average number of double bonds in the compound of formula (I) may comprise:
  determining the iodine number for the tung oil; and
  thereby determining the average number of double bonds in the compound of formula (I).

The may be appreciated that the iodine number may also be referred to as the iodine value, the iodine adsorption value or the iodine index. This may be understood to be the mass of iodine in grams that reacts with 100 grams of a chemical substance. Iodine numbers are often used to determine the amount of unsaturation in fatty acids.

It will be appreciated that the calibrated iodine number corresponds to the average number of double bonds. Accordingly, the method may comprise determining that the tung oil is suitable for use in a SHF if the iodine number is at least 100.

Accordingly, in a tenth aspect, there is provided a method of determining if a tung oil is suitable for use in a SHF formulation, the method comprising:
  determining the iodine number for the tung oil; and
  determining that the tung oil is suitable for use in a SHF if the iodine number is at least 100.

Preferably, the calibrated integration value is at least 125, at least 150 or at least 160, more preferably at least 170 or at least 180, even more preferably at least 185, at least 190, at least 195 or at least 200, and most preferably at least 210.

Determining the iodine number may comprise:
  reacting the tung oil with a known amount of an iodide-containing titration reagent;
  back titrating the unreacted iodine;
  calculated the amount of the iodine-containing titration reagent which has reacted; and
  thereby calculating the iodine number.

The iodide-containing titration reagent may comprise iodine monochloride. Preferably, the iodide-containing titration reagent is Wijs solution, i.e. iodine monochloride dissolved in acetic acid.

Preferably, back titrating the unreacted iodine comprises back-titrating by sodium thiosulphate.

Alternatively, or additionally, determining the average number of double bonds in the compound of formula (I) may comprise:
  analysing the tung oil using colorimetric analysis;
  assigning an L*, an a* and/or a b* value to the sample according to Lab colour space; and
  thereby determining the average number of double bonds in the compound of formula (I).

Advantageously, colorimetric analysis may be conducted quickly, and could provide in-line information during manufacture of a SHF formulation.

It may be appreciated that the Lab colour space describes mathematically all perceivable colours in the three dimensions L* for lightness and a* and b* for the colour opponents green—red and blue—yellow, respectively. The terminology "Lab" originates from the Hunter 1948 colour space. More information regarding the Lab colour space model may be found in Wei, H. Y., Yong, F. P., The Application of CIE Newest Colour Appearance Model, Packaging Engineering 26(4), 40-42 (2005) and in Fairchild, M. D., Colour Appearance Models, Reading, Mass. (1997).

In example 3, the inventors have shown that there is a strong correlation between the b* value and the number of double bonds in the compound of formula (I). Accordingly, the method preferably comprises assigning a b* value to the sample. The method may comprise determining that the tung oil is suitable for use in a SHF if the b* value is at least 1.0.

Alternatively, or additionally, the method may comprise assigning an L* value and/or an a* value to the sample. The method may comprise determining that the tung oil is suitable for use in a SHF if the L* value is less than 30 and/or the a* value is at least 0.5.

In an eleventh aspect, there is provided a method of determining if a tung oil is suitable for use in a SHF formulation, the method comprising:
  analysing a sample comprising tung oil using colorimetric analysis;
  assigning an L* value, an a* value and/or b* value to the sample according to Lab colour space; and
  determining that the tung oil is suitable for use in a SHF if the L* value is less than 30, the a* is at least 0.5 and/or b* value is at least 1.0.

Preferably, the method comprises determining that the tung oil is suitable for use in a SHF if the a* value is at least 1.0, more preferably at least 1.1, 1.2, 1.3, 1.4, 1.5 or 1.6, and most preferably at least 1.7, 1.8, 1.9, 2.0, 2.1, 2.2, 2.3 or 2.4. Preferably, the method comprises determining that the tung oil is suitable for use in a SHF if the a* value is less than 20, more preferably less than 19, 18, 17, 16, 14 or 12, and most preferably less than 10, 9, 8, 7, 6, 5, 4 or 3. Preferably, the method comprises determining that the tung oil is suitable for use in a SHF if the a* value is between 1.0 and 20, more preferably between 1.1 and 19, between 1.2 and 18, between 1.3 and 17, between 1.4 and 16, between 1.5 and 14 or between 1.6 and 12, and most preferably between 1.7 and 10, between 1.8 and 9, between 1.9 and 8, between 2.0 and 7, between 2.1 and 6, between 2.2 and 5, between 2.3 and 4 or between 2.4 and 3.

Preferably, the method comprises determining that the tung oil is suitable for use in a SHF if the b* value is at least 1.1, more preferably at least 1.2, 1.3, 1.4 or 1.5, even more preferably at least 2, 3, 4 or 5, and most preferably at least 5.5, 6.0, 6.1, 6.2, 6.3 or 6.4. Preferably, the method comprises determining that the tung oil is suitable for use in a SHF if the b* value is less than 20, more preferably less than 19, 18, 17, 16, 14 or 12, and most preferably less than 10, 9, 8 or 7. Preferably, the method comprises determining that the tung oil is suitable for use in a SHF if the b* value is between 1.1 and 20, more preferably between 1.2 and 19, between 1.3 and 18, between 1.4 and 17, between 1.5 and 16, between 2 and 14 or between 3 and 12, or between 4 and 11, and most preferably between 5 and 10, between 5.5 and 9, between 6 and 8 or between 6.4 and 7.

Preferably, the method comprises determining that the tung oil is suitable for use in a SHF if the a* value is at least 1.0 and the b* value is at least 1.0, more preferably where the a* value is at least 1.2 and the b* value is at least 1.2, even more preferably where the a* value is at least 1.5 and the b* value is at least 1.4, and most preferably where the a* value is at least 2 and the b* value is at least 3 or the a* value is at least 2.2 and the b* value is at least 5.

Preferably, the method comprises assigning an L* value to the sample according to Lab colour space, and determining that the tung oil is suitable for use in a SHF if the L* is less than 29. More preferably, the method comprises determining that the tung oil is suitable for use in a SHF if the L* value is less than 28, 27 or 26, and most preferably less than 25, 24, 23, 22, 21 or 20. Preferably, the method comprises determining that the tung oil is suitable for use in a SHF if the L* value is at least 1, more preferably at least 10, 11, 12, 13, 14 or 15, and most preferably at least 16, 17, 18 or 19. Preferably, the method comprises determining that the tung oil is suitable for use in a SHF if the L* value is between 1 and 35, more preferably between 10 and 30, between 11 and 29, between 12 and 28, between 13 and 27, between 14 and 26 or between 15 and 25, and most preferably between 16 and 23, between 17 and 22, between 18 and 21 or between 19 and 20.

The inventors believe that this use of colorimetric analysis is novel and inventive per se.

In a twelfth aspect, there is provided use of colorimetric analysis to determine if a tung oil is suitable for use in a SHF formulation.

In a thirteenth aspect, there is provided a method of manufacturing a self-healing fluid (SHF), the method comprising:
 identifying a suitable tung oil using the method of the seventh, tenth or eleventh aspect;
 contacting the suitable tung oil with an insulating cable oil to thereby create a SHF.

In a further aspect of the invention, there is provided a method of determining if a tung oil is suitable for use in a self-healing fluid (SHF) formulation, wherein the tung oil comprises a plurality of compounds of formula (I):

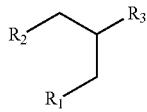

Formula (I)

wherein each $R_1$, $R_2$ and $R_3$ are independently an oxygen linked fatty acid; the method comprising:
 determining the average number of double bonds in the compound of formula (I); and
 determining that the tung oil is suitable for use in a SHF if the average number of double bonds is at least 7.25.

All features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying drawings, in which.

Figure 10:
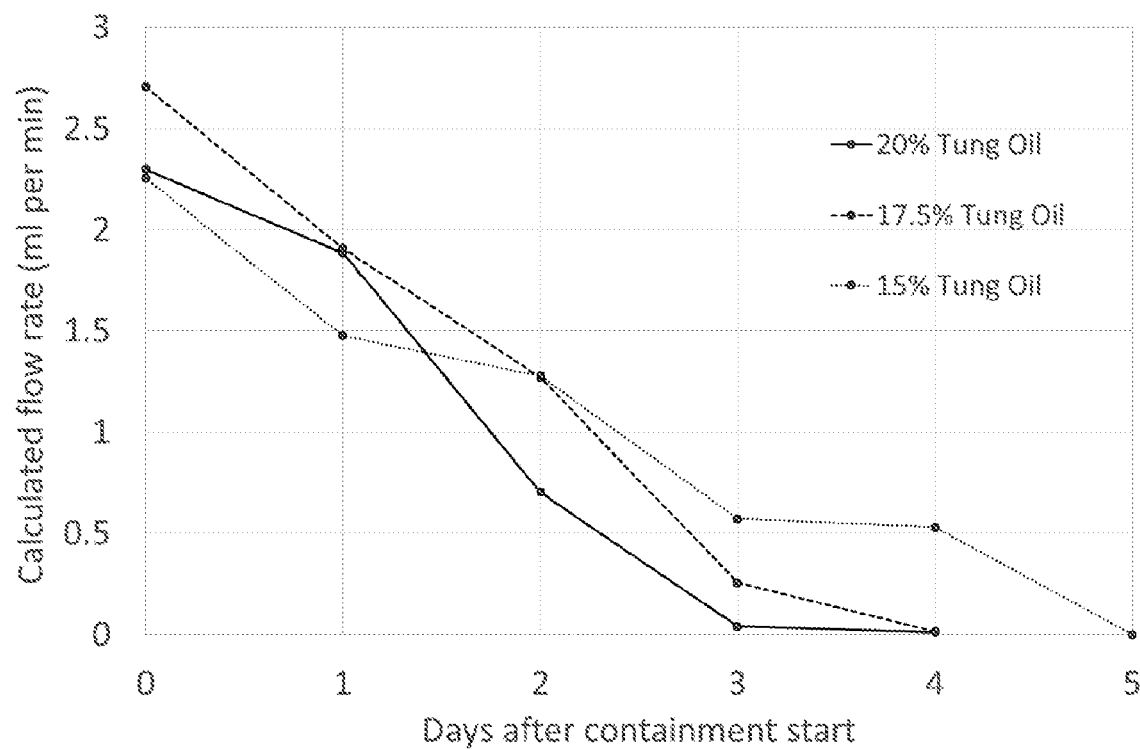
Figure 11:
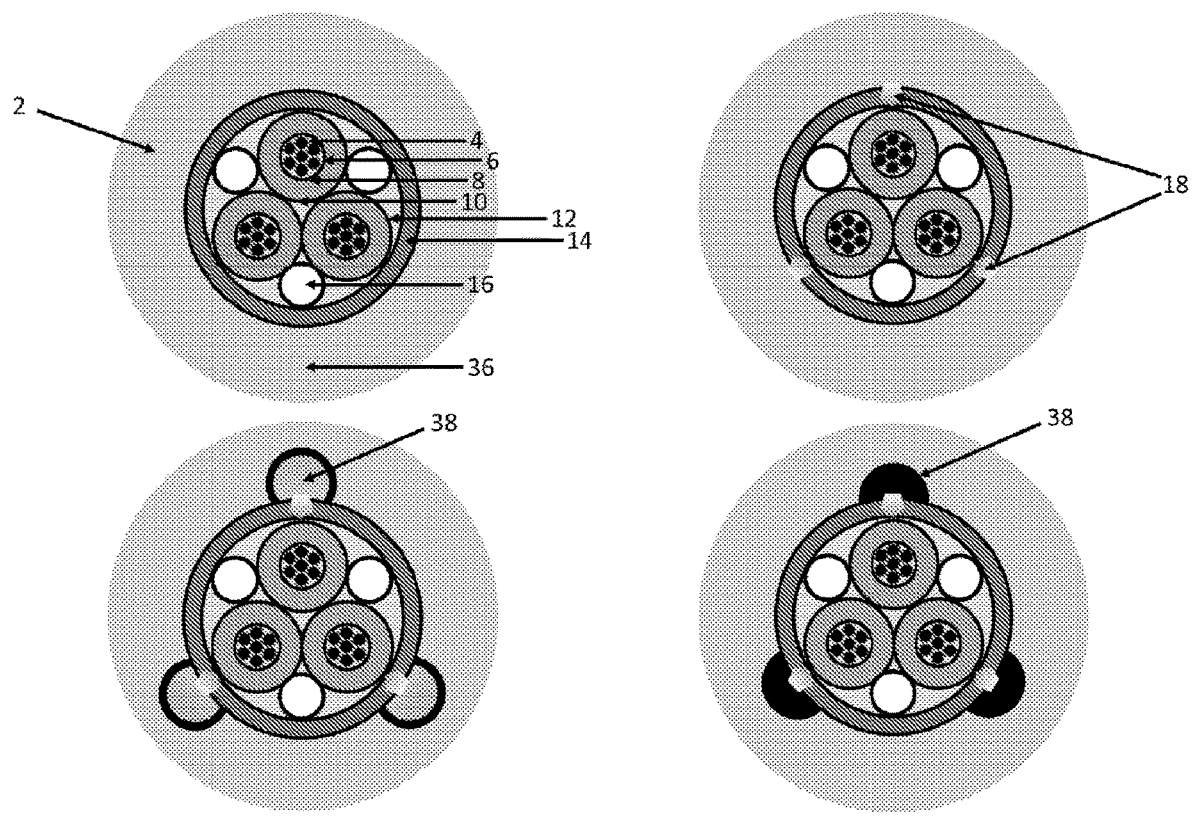
Figure 12:
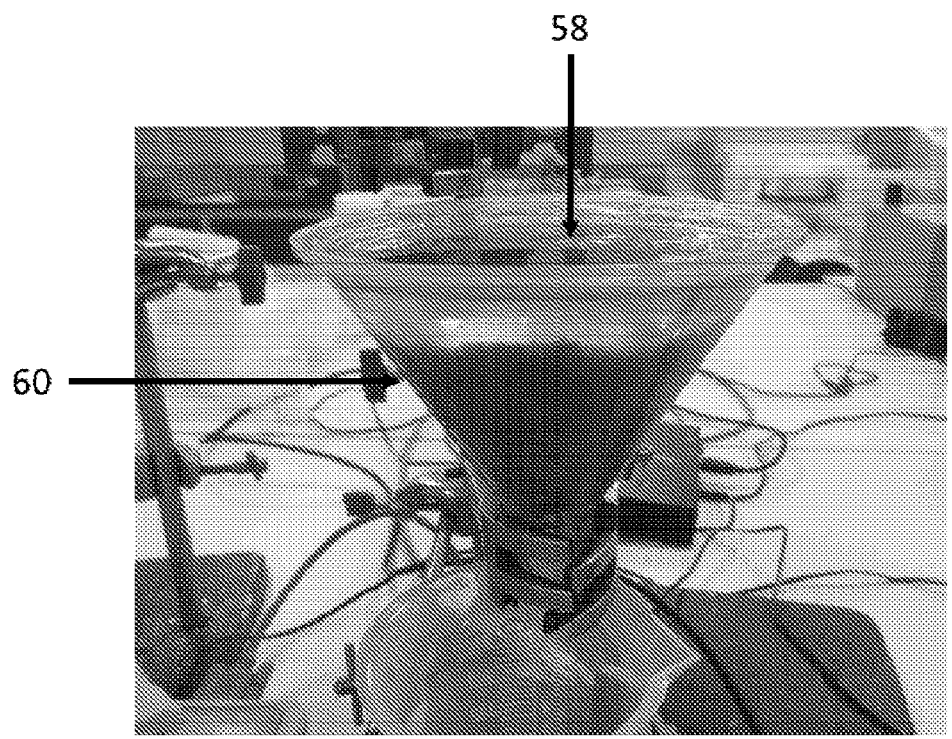
Figure 13:
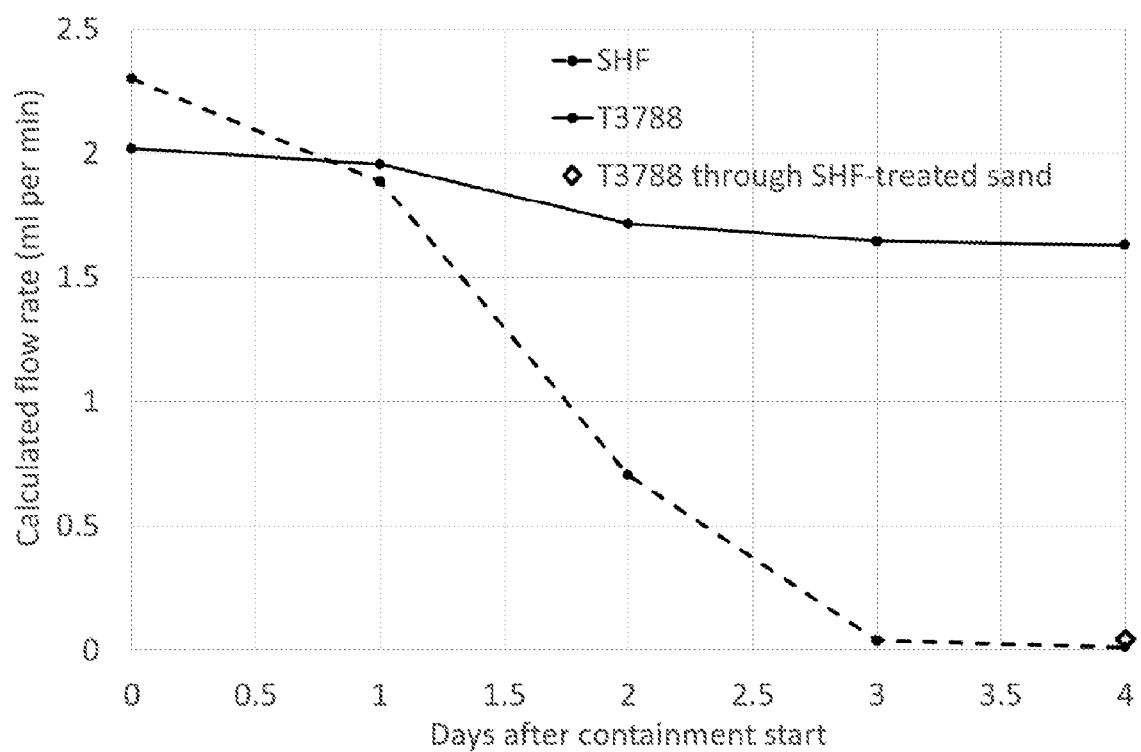
Figure 14:
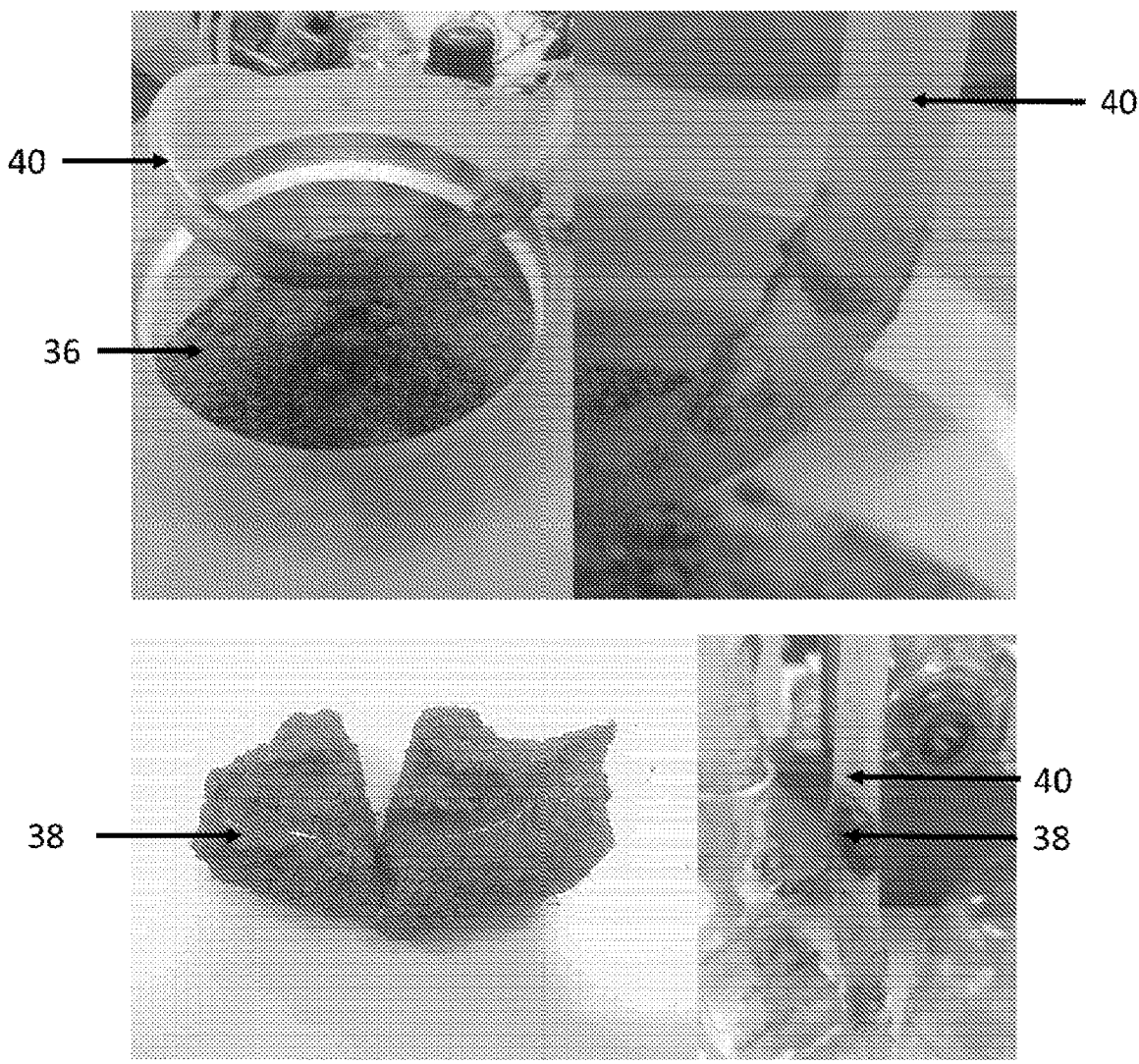

FIG. 9a-d are graphs showing the electrical breakdown voltage, the dielectric dissipation factor, the water content and the dynamic viscosities of standard insulation oil, an unpurified SHF and a purified SHF;

FIG. 10 is a graph showing the flow rate against time for three different formulations of SHF in backfill;

FIG. 11 (top left) is a cross section of a FFC disposed in backfill; FIG. 11 (top right) shows the FFC after having sustained damage; and FIG. 11 (bottom left) shows the FFC after the initial formation of a barrier; and FIG. 11 (bottom right)shows the FFC after complete formation of the barrier;

FIG. 12 shows a reservoir of standard insulation oil disposed above an SHF-treated backfill;

FIG. 13 shows the flow rate of standard insulation oil and a SHF through a column of backfill; and FIG. 14 shows the results when a SHF was leaked from a section of damaged piping into backfill.

EXAMPLE 1—FLUID FILLED CABLE (FFC) COMPRISING A SELF-HEALING FLUID (SHF)

Figure 1:
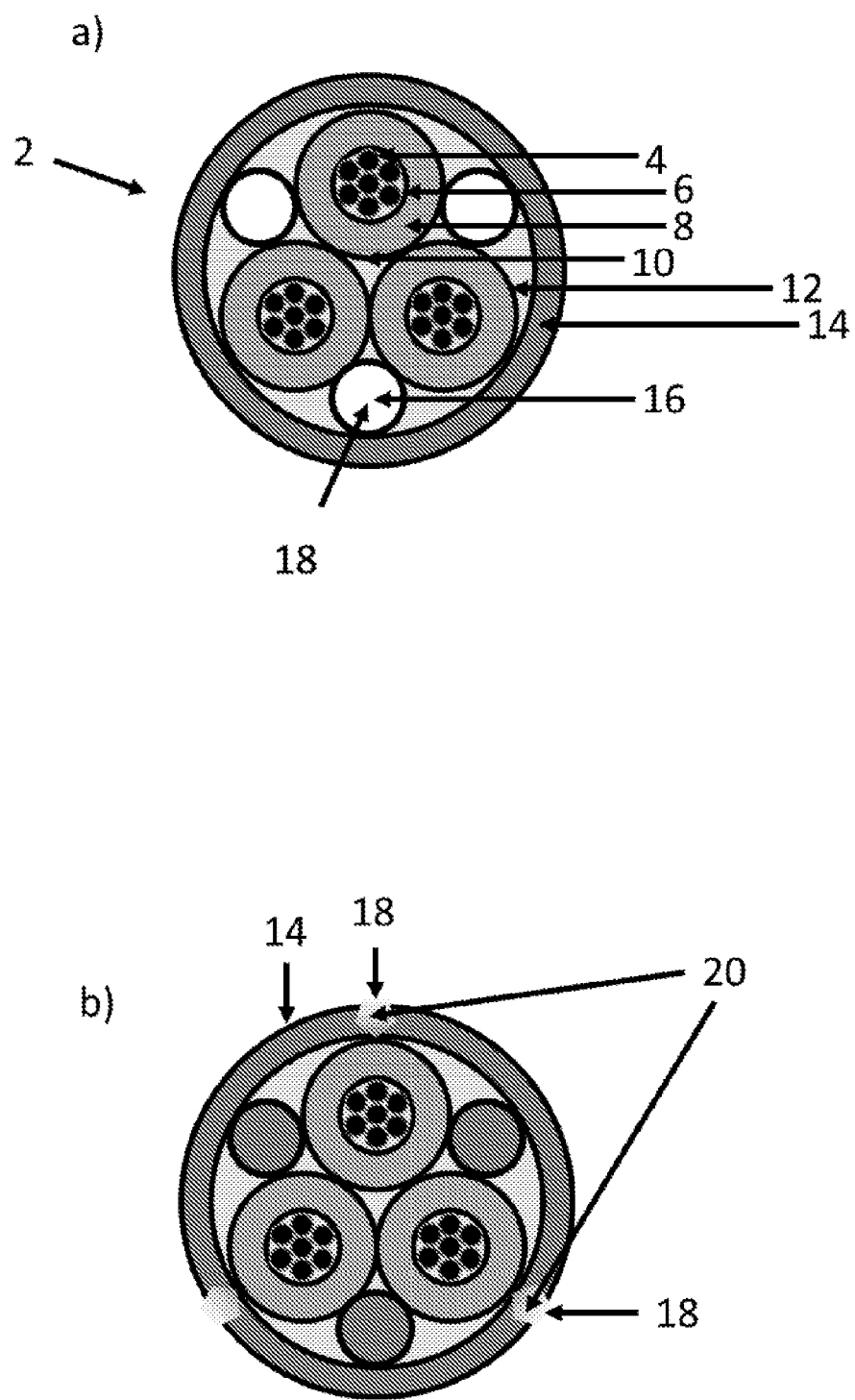
FIG. 1a is a cross section of a fluid filled cable (FFC)
FIG. 1b shows the FFC after having sustained damage.
FIG. 1c is shows the FFC after a cured mass has formed at the site of the damage.
Figure 1:
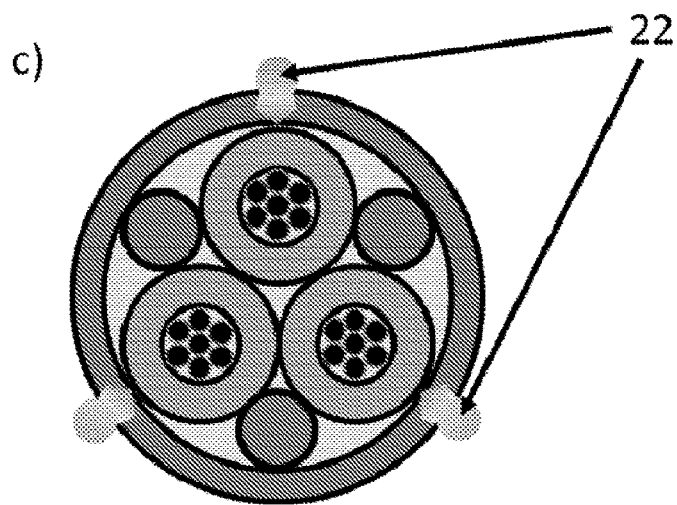

FIG. 1 shows a fluid filled cable (FFC) 2 in accordance with the present invention. The cable 2 is multiple core cable, comprising three conductive cores 4, but it will appreciated that the invention could also be applied to single core cable. As shown in FIG. 1, each core is surrounded by a first screen 6, an insulator 8 and a second screen 10. The cores are surrounded by a bedding component 12, and are disposed in a sheath 14. The bedding component 12 defines oil ducts 16 therein which allow a self-healing fluid (SHF) 18 to flow along the cable and diffuse into the bedding component 12. As discussed below, the SHF comprises an insulating cable oil, a drying oil and a catalyst.

As shown in FIG. 1b, the cable may sustain damage 20 to the sheath 14, allowing the SHF 18 to leak therefrom. However, as the SHF 18 leaks from the fluid it is exposed to oxygen causing it to cure and create a seal 22, as shown in FIG. 1c. This seal 22 prevents further leakage from the cable 2.

EXAMPLE 2—MODELLING THE PERFORMANCE OF A SHF IN FFC

Figure 2:
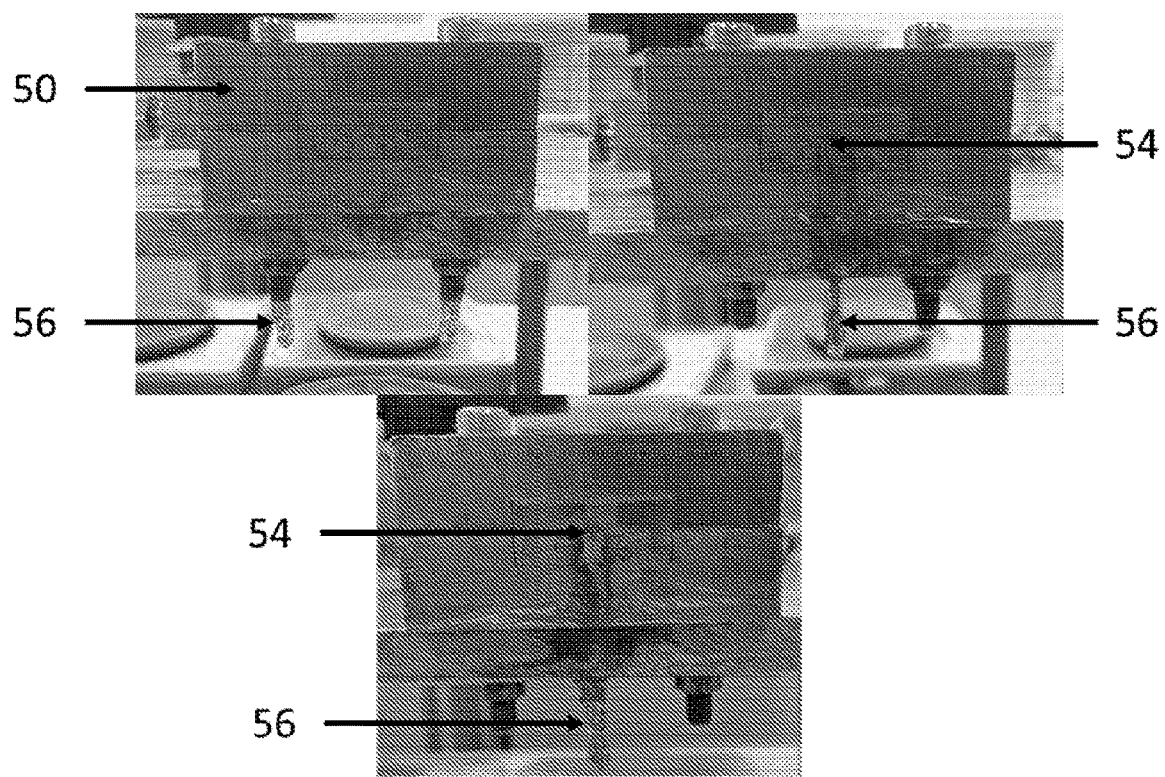
FIG. 2 shows the progression of a self-healing fluid (SHF) in an experimental test rig.
Figure 3:
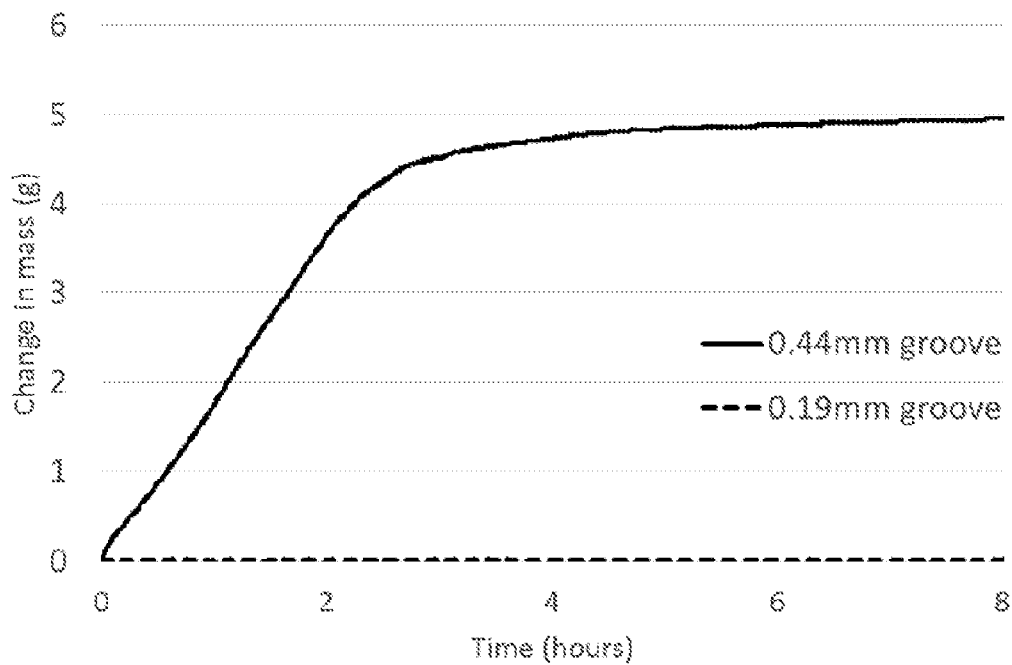
FIG. 3 shows the change in mass with time during a performance test of the SHF using defined leak defect sizes; in both cases, the change in mass stops abruptly after a short period of time, indicating that the SHF has sealed the defect site.

The self-healing performance of the SHF was evaluated using a bespoke experimental rig 50, see FIG. 2, designed to monitor the flow of oil through a defined defect $\sqrt[3]{}$ equivalent to those found within FFC sheathing. In these tests, oil is allowed to flow through the test block and fall into a continuously weighed catchment pot (not shown). As the SHF begins to cure, the leak rate slows, resulting in a commensurate decrease in the change in mass of the catchment pot. Once no further mass increase is recorded, the system is considered to have healed. For instance, FIG. 3 shows the change in mass against time for two different performance tests. It is noted that when the system comprised a 0.19 mm slot defect the system was found to have healed almost immediately, whereas when a 0.44 mm slot defect was used the system was found to have healed after 2.5 hours.

As shown in FIG. 2 stalactites 56 were found to form over the course of the experiment. Upon inspection, these have been found to be tough, self-supporting structures that contain a volume of insulation oil.

EXAMPLE 3—TUNG OIL

A drying oil that has broad applicability is Tung oil, or China wood oil, is a drying oil and is obtained by pressing the seed from the nut of the tung tree. It was selected as an effective component of SHF from initial screening tests. Since tung oil is a natural product, its structure is heavily influenced by a number of different factors, including the environment in which the tung tree is grown.

The inventors have found that tung oils possess a large range of variables, including colour, water content, acid content, viscosity, and (critically) reactivity. The reactivity of a drying oil as part of an SHF formulation was assessed by healing time by the methods described in example 2; more rapid healing is advantageous to SHF performance and grounds for selection of drying oils. Preliminary investigation identified tung oil as a candidate drying oil, with generally suitable curing performance from a range of sources. Nonetheless, as with many naturally derived drying oils, tung oil has variable composition, leading to variation in healing activity. Accordingly, the inventors identified the need to establish reliable, versatile metrics that can be used by cable oil suppliers to ensure that the system will possess the desired reactive qualities.

The inventors sought to determine the primary structural factors affecting tung oil based SHF curing activity. The general structure of the main component of tung oil is:

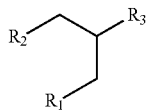

Where $R_1$, $R_2$ and $R_3$ are each independently an oxygen linked fatty carboxylate residue. The fatty carboxylates are generally selected from α-eleostearate; β-eleostearate; linoleate; conjugated linoleates; linolenate; palmitate; stearate and oleate.

Figure 4:
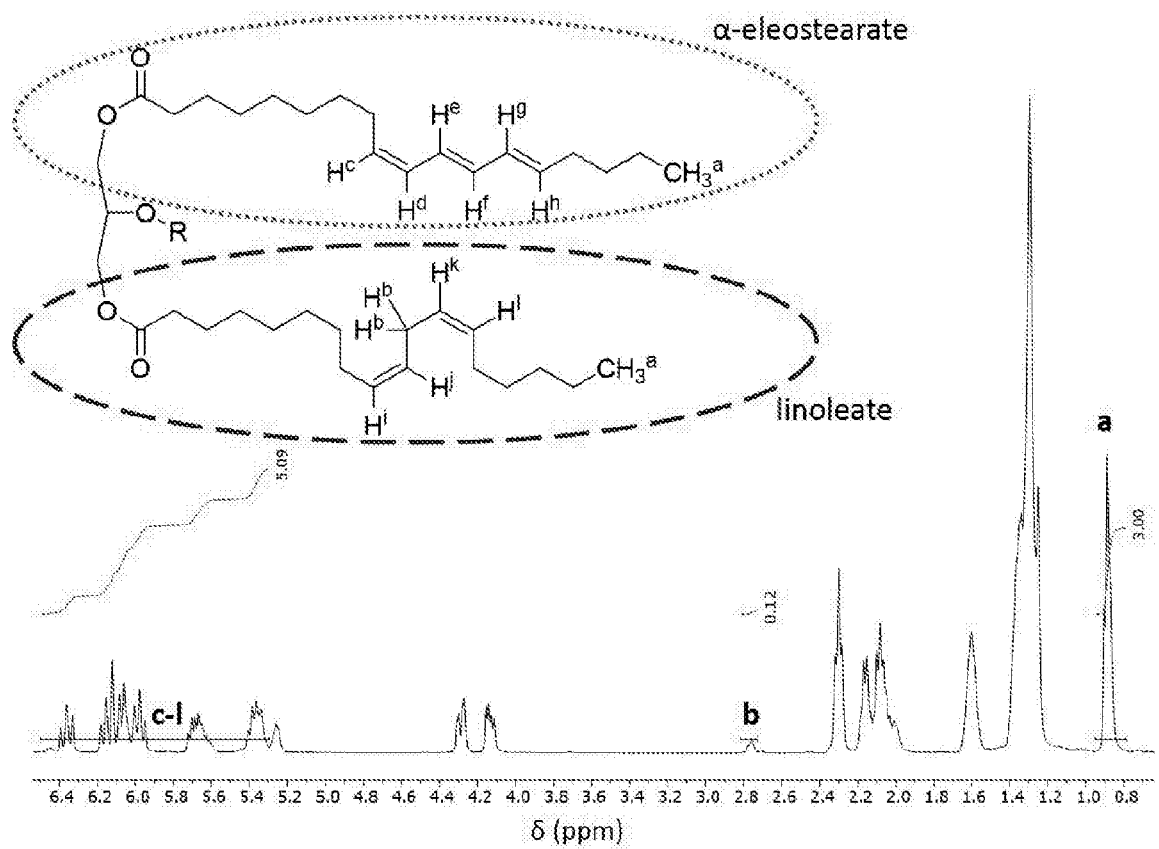
FIG. 4 shows an NMR spectrum of a tung oil sample annotated to identify the resonances associated with α-eleosterate and linoleate residues.

FIG. 4 shows an example structure of a tung oil triglyceride unit. It should be noted that the structure is not representative of the overall composition; to highlight the appearance of characteristic spectral features, the example structure comprises one linoleate residue and one α-eleostearate—the remaining residue R may be any from the above list. The α-eleostearate residues each contain three conjugated carbon-carbon double bonds which may be broken and crosslinked. It will be appreciated that each unsaturated bond has the following structure:

These olefinic hydrogens give rise to multiple resonances in a $^1$H NMR spectrum between 6.5 ppm and 5.3 ppm (region labelled c-1 on FIG. 4). That spectral region may also contain resonances corresponding to the olefinic hydrogens of linoleate, linolenate, conjugated linoleate and oleate residues, and indicates the presence of potential crosslinking sites.

The linoleate residue features two carbon-carbon double bonds separated by one doubly allylic $CH_2$ group (b on FIG. 4). The doubly allylic hydrogens give rise to a resonance centred at 2.75 ppm in the $^1$H NMR spectrum. Assessment of the linoleate content of a tung oil may be achieved by integration of the resonance and scaled ratio comparison to the integral of a calibrated reference resonance or resonance region—for example the methyl resonance region (a on FIG. 4), used due to each of the possible fatty carboxylate chains present in tung oil terminating in a single methyl $CH_3$ group—with no other structural groups giving rise to resonances in that spectral region. The presence of linoleate or other carboxylates featuring one or more doubly allylic $CH_2$ groups (including linolenate, the proportion of which, if present, is also estimable by the use of $^1$H NMR spectrum integral ratios) is necessary for acceleration of the SHF curing process through mechanisms activated by the selected catalysts. These can be considered activating residues. Typically, a drying oil will comprise at least 5 mol % by mole fraction activating residues, which may enable SHF curing on a suitable timescale. If a drying oil is particularly depleted in activating residues (<5 mol %) as determined by NMR spectroscopy, an additional component may be added to replace the drying oil in part, in order to accelerate curing. The additional component may be a drying oil rich in activating residues, a monoester of an activating residue, an alkyd resin rich in activating residues, or an activating small molecule additive not featuring an unsaturated alkyl chain. In static SHF curing tests under low catalyst loading conditions (50-100 ppm), addition of a linoleate or linolenate monoester at a mass fraction of 1 mol % of SHF (equivalent to 5 mol % of tung oil residue content) prior to catalyst addition led to significant acceleration of initial gelation point, from 2.5 h to 15 mins.

The categorisation of commercial oils, including tung oil, as drying oils relies on the substance composition comprising sufficient residues capable of crosslinking. This includes activating residues and conjugated diene or triene residues (propagating residues). Provided sufficient activating residues are present (see above), a drying oil will be able to cause curing of an SHF on a timescale relevant to delivery of self-healing function to a power cable where sufficient propagating residues are present. Since some resonances related to propagating residues overlap with those for activating residues or inactive residues (primarily oleate) in the $^1$H NMR spectrum, the total unsaturation per residue chain (and, with the assumption that the vast majority of residue units are connected to a triglyceride, unsaturation per triglyceride) can be used as an effective proxy.

The total unsaturation per residue chain is calculated from the $^1$H NMR spectrum. The total integration of the region between 6.5 ppm and 5.3 ppm is calibrated using the methyl resonance integration (a, between 0.8 and 0.94 ppm; set at equivalent to 3 $^1$H nuclei); on the assumption that all unsaturated groups are internal olefins with two C—H bonds, the unsaturation per residue chain is then estimated and the unsaturation per triglyceride is estimated as unsaturation per chain multiplied by 3.

For example, the drying oil from which the $^1$H NMR spectrum in FIG. 4 is derived is tung oil, and has an estimated unsaturation per chain of 2.55, or unsaturation per triglyceride of 7.65. In addition, the tung oil was found to have 6.1 mol % activating residues (6.1 mol % linoleate, 0 mol % linolenate). In curing tests according to example 2, an SHF comprising that tung oil was found to heal within 2 hours with 500 ppm catalyst loading (equivalent to 1.6 mmol/dm$^3$).

EXAMPLE 4—PROPERTIES OF THE SHF

As mentioned above, the SHF comprises an insulating cable oil, a drying oil and a catalyst. The dielectric fluid used by the inventors was T3788 Cable Fluid, available from H&R Gruppe. The drying oil was sample (b) of the tung oil, described in example 3, which is available from Aldrich. The catalyst used was an iron-based catalyst at a concentration of 0.5 wt %. A compatibiliser was also added to overcome problems with the miscibility of the catalyst, and this was a zinc-based soap at a concentration of 2 wt %.

Figure 8:
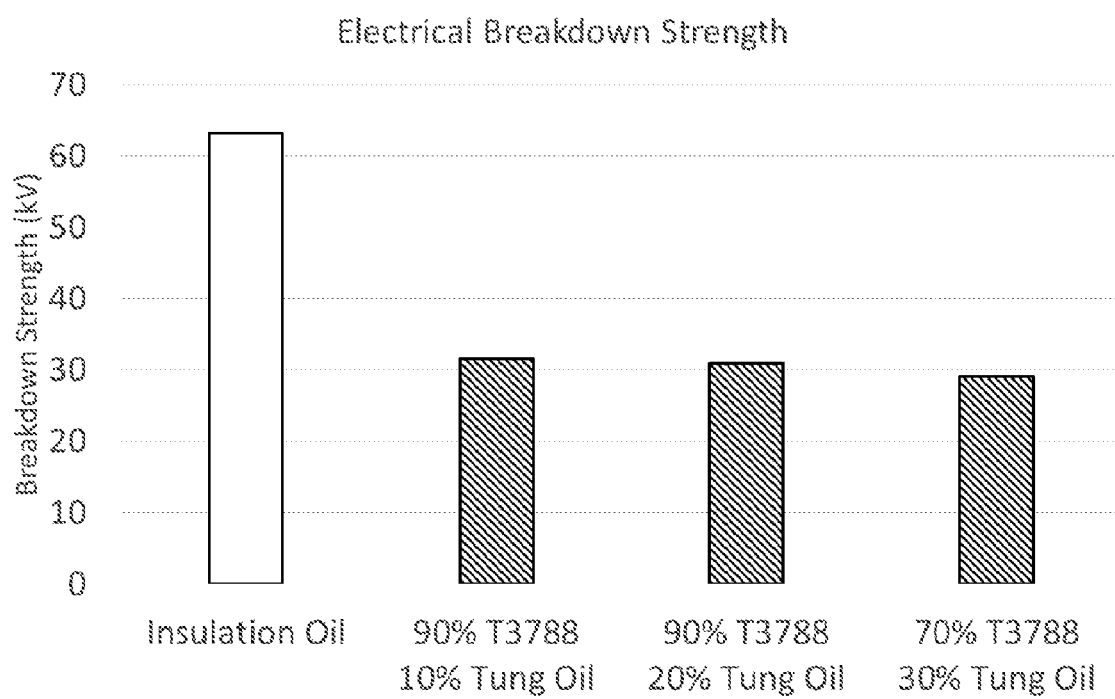
FIG. 8 is a graph showing the electrical breakdown voltage for standard insulation oil and three different formulations of unpurified SHF.

It will be appreciated that since the SHF is replacing existing electrical insulation oils, such as pure T3788, it must possess similar or superior electrical and dielectric properties. However, initial electrical testing of SHF blends showed that the addition of the tung oil to the T3788 resulted in a substantial deterioration in electrical properties, see FIG. 8. Such a formulation would not be capable of functioning as an insulation fluid.

Figure 7:
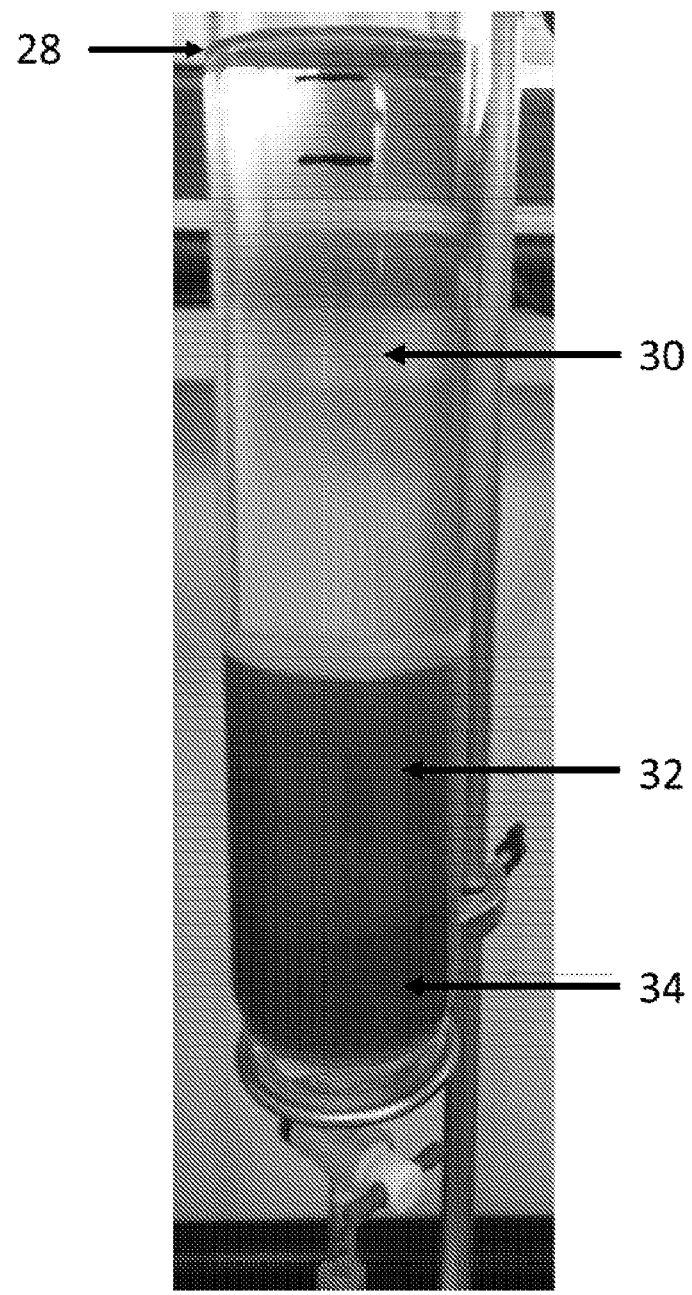
FIG. 7 shows purification apparatus.

The inventors developed a purification procedure, using the column 28 shown in FIG. 7. The process comprises filtering a formulation 30 comprising the dielectric fluid and the drying oil through a layer of Fuller's Earth 32, to remove polar impurities. Sharp sand 34 was present at the base of the column 28 to protect the column frit from being clogged by particles of Fuller's Earth. The formulation 30 is subsequently filtered through a nitrocellulose membrane filter with a pore size of 8.0 µm to remove suspended sand particles. The catalyst is added after this process has been conducted. The inventors note that in practice the catalyst and compatibiliser would be added immediately before deployment to avoid premature curing of the system.

Figure 9:
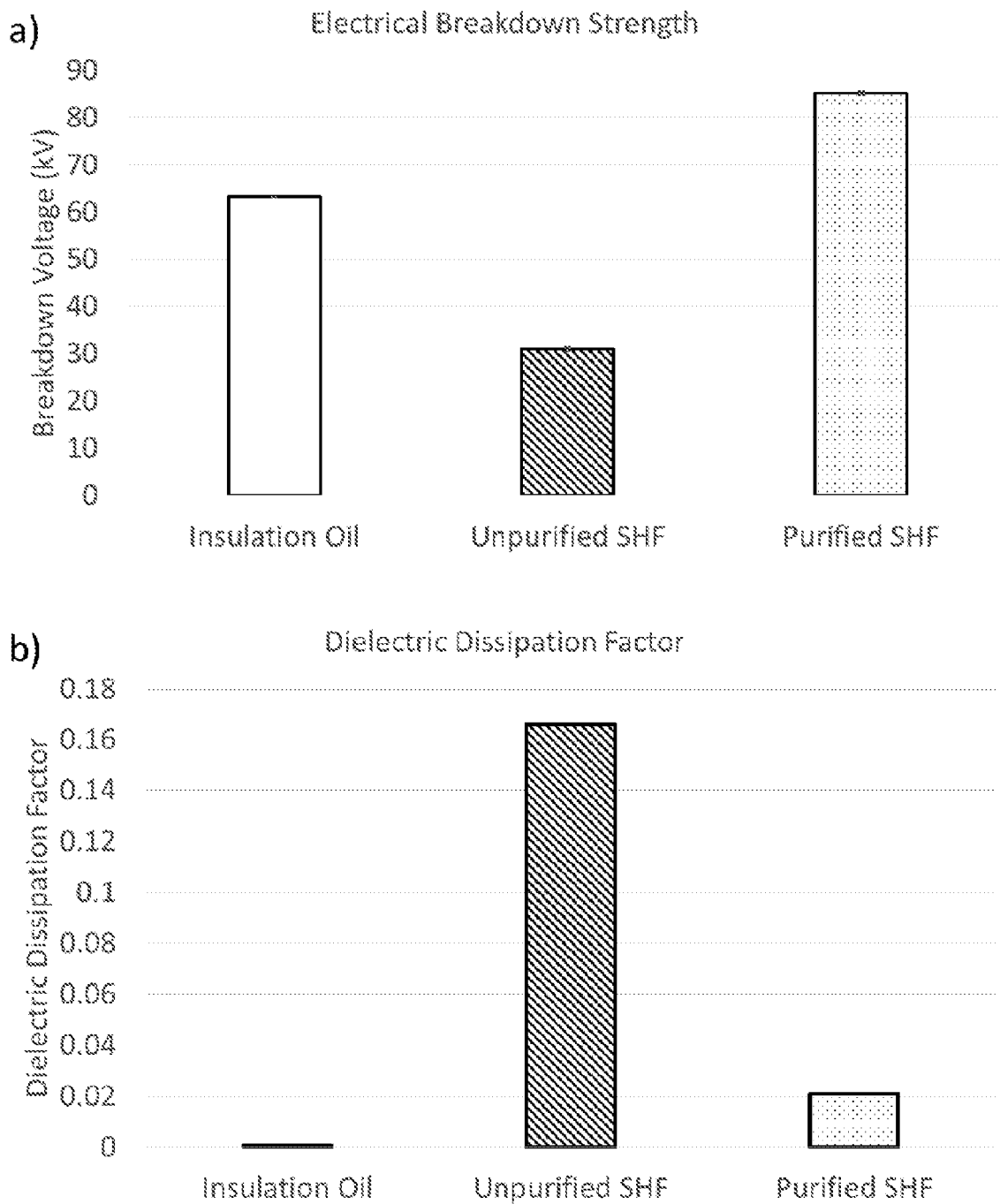
Figure 9:
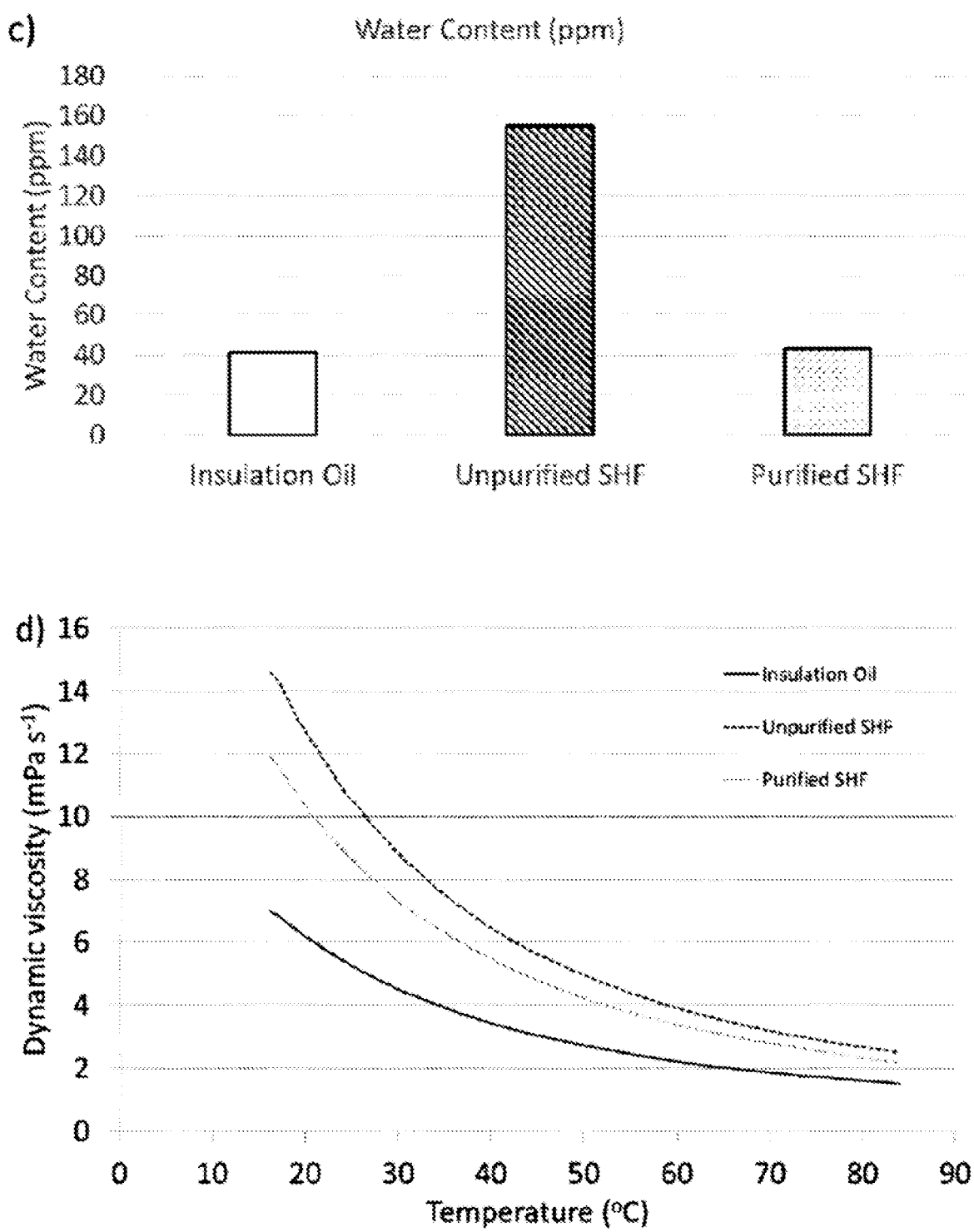

Samples of purified oil show significant clarification, and good reactivity was retained. The data shown in FIG. 9 is for a drying oil with a weight ratio of tung oil to T3788 of 20:80. As shown in FIG. 9a, there is a marked increase in electrical breakdown strength (to a point greater than even T3788). FIGS. 9b and c shows that the dielectric dissipation factor (DDF) and water content are significantly reduced when compared to the unpurified oil.

Figure 5:
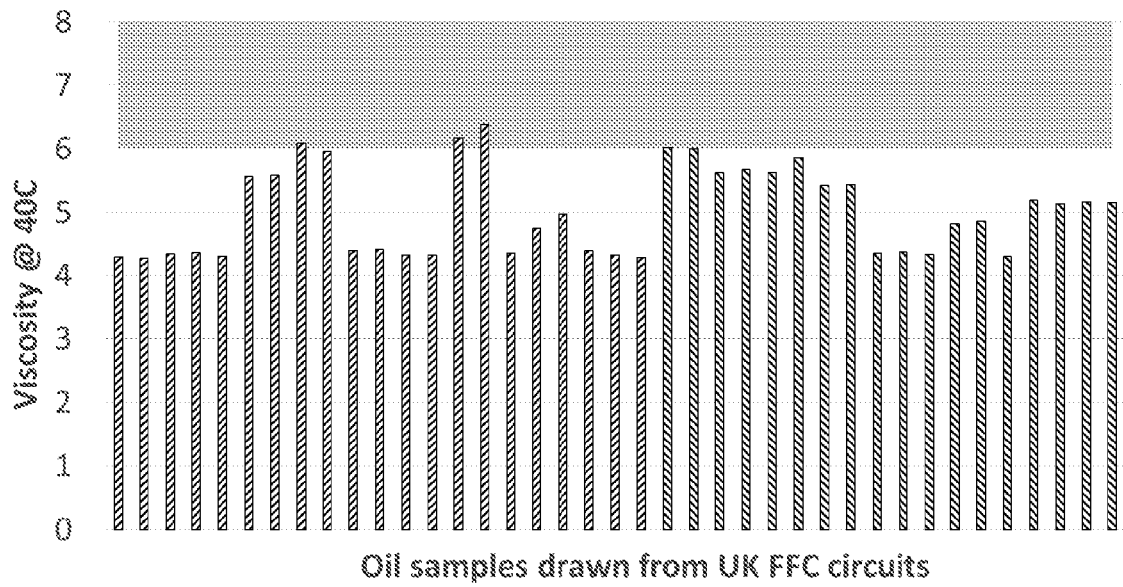
FIG. 5 shows the viscosity of a number of samples of oil at 40° C.

It will also be appreciated that the SHF should possess a similar viscosity to the cable oil which it is replacing. FIG. 5 shows the viscosity of a variety of in-service insulation fluids (Bradford West Samples 1 to 7, Peel 132 kV Samples 1 to 4 and Purfleet Samples 2 to 11) as well as some test formulations. The viscometer used was a Brookfield DV2T viscometer using a 'UL adapter' and measurements were taken at 25 RPM, or a shear rate of 30.580 s$^{-1}$ at a temperature of 40° C. The line across the graph indicates the viscosity of T3788 at 20° C. As the in-service samples were all drawn from currently operational circuits, it is reasonable to assume that these viscosities can be tolerated.

Figure 6:
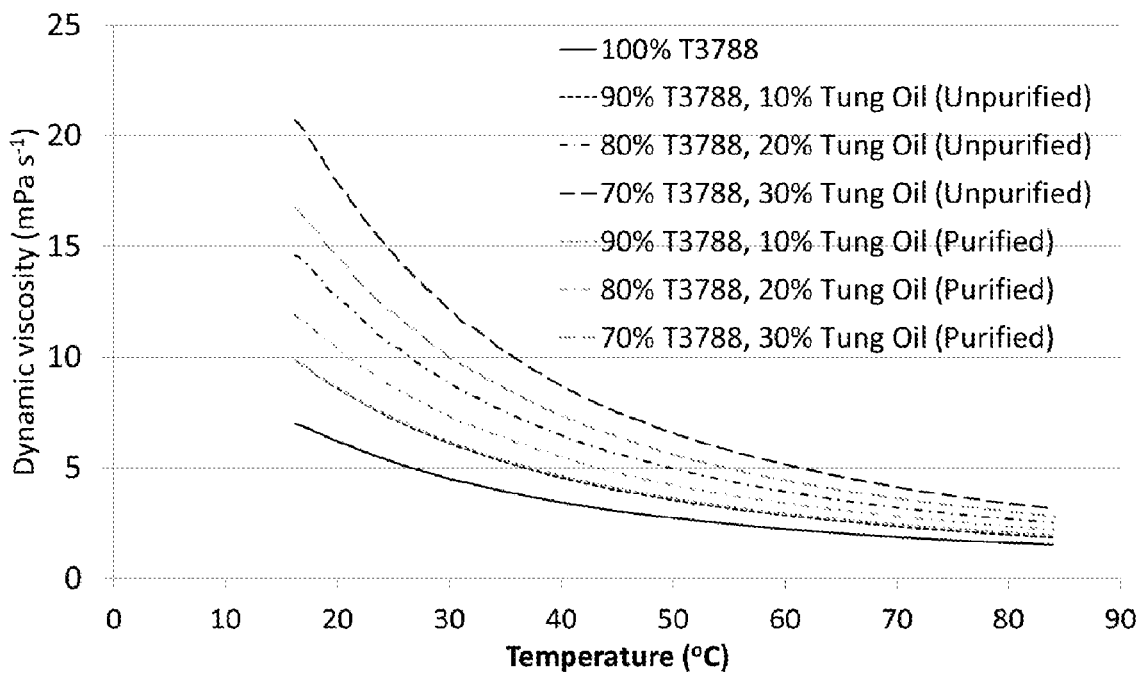
FIG. 6 shows the viscosity of three different SHF formulations over a range of temperatures both before and after purification.

As shown in FIG. 9d, the viscosity of the purified oil is 20% lower than the viscosity of the unpurified oil. FIG. 6 shows that the viscosity of the purified oil increases as the percentage of tung oil in the composition increases, but for each formulation purified oil is of lower viscosity than unpurified oil. A cone and plate rheometer was used, where the cone and plate each had a diameter of 5 cm and the cone had a 1° angle. Measurements were taken between 20° C. and 80° C., with a temperature change of 2° C. per minute, and the shear rate was 1000 s$^{-1}$.

Finally, the inventors tested the ability of compositions comprising differing amounts of tung oil to heal a system, and the results are shown in FIG. 10. All of the blends tested were viable, but the time required to achieve containment is higher for formulations with lower concentrations of tung oil.

EXAMPLE 5—USING SHF WITH A BACKFILL

The inventors decided to investigate the effect a backflow, or granulated material, had on the ability of SHF to cure, and thereby heal the cable system.

In order to assess the effects of backfill, the inventors passed samples of T3788 and a SHF (comprising a weight ratio of T3788 and tung oil of 80:20) through columns of backfill and measured the rate at which oil leaked from the column into a continuously weighed pot. The calculated leak rate against time is shown in FIG. 13. It can be seen the leak rate of T3788 decreases slightly towards the start of the experiment before stabilizing. This is attributed to subsidence initially restricting the flow of oil through the backfill. By comparison, the SHF shows a very marked decrease in leak rate over 4 days, resulting in almost complete cessation in oil flow. This is attributed to the curing of the SHF within the backfill resulting in an oil-proof barrier.

Furthermore, when backfill treated previously with SHF is challenged with T3788, the leak rate is again significantly reduced, see single point at the bottom right of FIG. 13. In fact, the inventors observed that a reservoir 58 forms on the top of the backfill 60, see FIG. 12. This demonstrates that the oil-resistant properties of the layer are not dependent upon the self-healing properties of the percolating oil.

To further investigate the effect of the backflow, the inventors constructed a rig where a length of piping 40 was damaged and buried in backfill 36, and SHF was then introduced via a peristaltic pump. It was observed that there was an initial period where oil 18 spread through the backfill 36 and coated the outermost sheath of the piping 40, resulting in an aggregation of backfill 36 into the site directly adjacent to the breach. This then cured, resulting in the formation of an oil-proof plug 38 comprising the backfill that served to prevent further flow of oil 18 from the piping. This is shown in FIG. 14.

The inventors found that the mechanical properties of this direct sealing method are superior to those from crosslinked oil, as evidence by the fact that hand tools were required to break the seal open to access the piping 40 underneath. The inventors note that when the piping 40 shown in FIG. 14 was excavated from the backfill 36 the plug 38 withstood several direct hits from a mallet, after which a chisel was employed to crack it open. Although most of the material came away from the piping cleanly (highlighted by the reflective interior surface of the backfill) the region over the leak site possessed good enough adhesion that it remained despite the damage dealt to the sample in breaking it open.

Accordingly, the inventors envisage that a cable 2 could be disposed in backflow 36, as shown in FIG. 11. This system would exhibit improved healing properties as explained above.

CONCLUSIONS

The inventors have identified a procedure for preparing suitable SHF that can act as a cable dielectric fluid with improved physical properties. In particular, the compositions produced by the inventors had an improved breakdown strength and acceptable viscosity, and are capable of sheath and joint local repair and also supporting containment of the fluid by commonly used cable backfills. The inventors were able to show that their compositions could be used to heal a breach in a system.

The invention claimed is:

1. A method of purifying a self-healing fluid (SHF) comprising a drying oil and dielectric fluid, the method comprising:
   a) filtering the SHF through an absorbent material; and
   b) subsequently filtering the SHF through a micropore filter system.

2. The method according to claim 1, wherein the absorbent material comprises Fuller's Earth.

3. The method according to claim 1, wherein the method comprises recovering the SHF from the absorbent material.

4. The method according to claim 1, wherein the micropore filter system comprises a membrane filter with a pore size of less than 50 µm, less than 40 µm, less than 30 µm, less than 20 µm, less than 15 µm, less than 12.5 µm, less than 10 µm, or less than 9 µM.

5. The method according to claim 1, wherein the method comprises repeating steps (a) and (b) consecutively at least once, optionally wherein the oil is continuously recirculated through a purification system.

6. A method of producing a purified self-healing fluid (SHF), the method comprising:
   contacting one or more drying oils and a dielectric fluid to produce a SHF; and
   purifying the SHF as defined in claim 1.

7. The method according to claim 1, wherein the weight ratio of the drying oil to the dielectric fluid is between 5:95 and 35:65, between 10:90 and 30:70, or between 15:85 and 25:75.

8. The method according to claim 1, wherein the dielectric fluid is an insulating cable oil.

9. The method according to claim 1, wherein the drying oil is tung oil.

10. The method according to claim 1, wherein the drying oil is selected by assessment of composition through spectroscopic analysis, with respect to the level of:
    average unsaturation per triglyceride unit; and
    mole fraction of residues containing doubly allylic $CH_2$ groups.

11. The method according to claim 1, wherein a further drying oil or small molecule is added to the SHF formulation to increase the mole fraction of residues containing doubly allylic $CH_2$ groups.

12. The method according to claim 1, wherein subsequent to purifying the SHF, the method comprises adding a catalyst to the purified SHF.

* * * * *